(12) United States Patent  (10) Patent No.: US 9,019,401 B2
McKay  (45) Date of Patent: Apr. 28, 2015

(54) SYSTEM AND METHOD FOR CREATING AN IMAGE WITH A WIDE DYNAMIC RANGE

(71) Applicant: GM Global Technology Operations LLC, Detroit, MI (US)

(72) Inventor: Neil David McKay, Chelsea, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 139 days.

(21) Appl. No.: 13/776,766

(22) Filed: Feb. 26, 2013

(65) Prior Publication Data

US 2014/0240547 A1  Aug. 28, 2014

(51) Int. Cl.
*H04N 5/265* (2006.01)

(52) U.S. Cl.
CPC ..................................... *H04N 5/265* (2013.01)

(58) Field of Classification Search
None
See application file for complete search history.

(56) References Cited

U.S. PATENT DOCUMENTS

2010/0053346 A1* 3/2010 Mitsunaga ............... 348/208.6
2013/0070965 A1* 3/2013 Jang et al. ................ 382/103

\* cited by examiner

*Primary Examiner* — Twyler Haskins
*Assistant Examiner* — Angel L Garces-Rivera
(74) *Attorney, Agent, or Firm* — Quinn Law Group, PLLC

(57) ABSTRACT

A system for creating an image with a wide dynamic range includes an imaging unit, a processing unit and a control unit operatively connected to each other. The imaging unit is configured to acquire a plurality of images of a scene at respective exposure times such that each of the respective exposure times are different from one another. The images are each represented by a set of pixels, each defining a respective pixel intensity. The processing unit is configured to combine the plurality of images to produce a combined image based at least in part on weighting factors assigned to each pixel and a mapping graph.

19 Claims, 2 Drawing Sheets

SYSTEM AND METHOD FOR CREATING AN IMAGE WITH A WIDE DYNAMIC RANGE

TECHNICAL FIELD

The disclosure relates generally to a system and method of generating an image with a wide dynamic range.

BACKGROUND

Many conventional digital cameras generate images with a limited dynamic range, for example, if the camera employs 8-bit pixels, the resulting image is limited to 256 distinct values. The result is that pictures taken in high-light-contrast situations must either use a short exposure time and sacrifice the ability to resolve dark parts of the image, or they must use a long exposure time, resulting in saturation or overexposure of bright parts of the image.

SUMMARY

A system and method for creating an image with a wide dynamic range includes an imaging unit, a processing unit and a control unit operatively connected to each other. The system allows the generation of images that have a wide dynamic range, i.e. images where both very dark and very bright portions of the image are accurately represented. The imaging unit is configured to acquire a plurality of images of a scene at respective exposure times such that each of the respective exposure times are different from one another. The plurality of images are each represented by respective sets of pixels defining respective pixel intensities. Each pixel in the respective sets of pixels is identifiable by a two-dimensional coordinate.

The processing unit is configured to combine the plurality of images to produce a combined image represented by a set of combined pixels. For each of the two-dimensional coordinates, the processing unit is configured to receive the respective pixel intensities for each of the images from the imaging unit. The processing unit is configured to assign a respective weighting factor to the respective sets of pixels in each of the images. A respective combined intensity value for the set of combined pixels is obtained at each of the two-dimensional coordinates. The processing unit is configured to convert the respective combined intensity values into respective mapped values using a mapping graph and the respective mapped values are used to generate the combined image.

The control unit is configured to set a first exposure time to a first predetermined value and direct the imaging unit to acquire a first of the plurality of images using the first exposure time. The control unit is configured to set a second exposure time to a second predetermined value and direct the imaging unit to acquire a second of the plurality of images at the second exposure time. The control unit is configured to determine if a sufficient number of images have been obtained based on whether a predefined condition is satisfied.

The control unit is configured to obtain additional images if the predefined condition is not satisfied. In one example, the predefined condition is satisfied when at least 20% of the respective pixel intensities of the first and second of the plurality of images have reached a saturated value. For example, the control unit may be configured to set a third exposure time to a third predetermined value and direct the imaging unit to acquire a third of the plurality of images at the third exposure time if the predefined condition is not satisfied. In one example, the second exposure time is a constant multiplier of the first exposure time. In another example, the first exposure time is 2.5 milliseconds; the second exposure time is 10 milliseconds and the third exposure time is 40 milliseconds.

The control unit defines a maximum allowed pixel value for each of the respective pixel intensities. The respective weighting factor may be set as the respective exposure time if the respective pixel intensity is below the maximum pixel value and zero if the respective pixel intensity is at the maximum pixel value. The control unit is configured to set the respective combined intensity value as the maximum allowed pixel value if the sum of the respective weighting factors is zero.

The processing unit may obtain the respective combined intensity values for each of the set of combined pixels by first determining a first value for each of the plurality of images as a product of the respective pixel intensities and the respective weighting factors, divided by the respective exposure time. A second value is determined by adding the first value for each of the plurality of images. The respective combined intensity value is obtained by dividing the second value by a sum of the respective weighting factors for each of the plurality of images.

In the embodiment shown, a first portion of the mapping graph is a linear scale and a second portion of the mapping graph is a logarithmic scale. In one example, the first portion of the mapping graph is applied to respective pixel intensities that are less than 3% of a maximum allowable pixel value.

The imaging unit, the control unit and the processing unit may all be part of a single device. The processing unit may include at least one AND logic gate, at least two memory units, at least one comparator unit and at least one divider unit.

The above features and advantages and other features and advantages of the present invention are readily apparent from the following detailed description of the best modes for carrying out the invention when taken in connection with the accompanying drawings.

DETAILED DESCRIPTION

Figure 1:
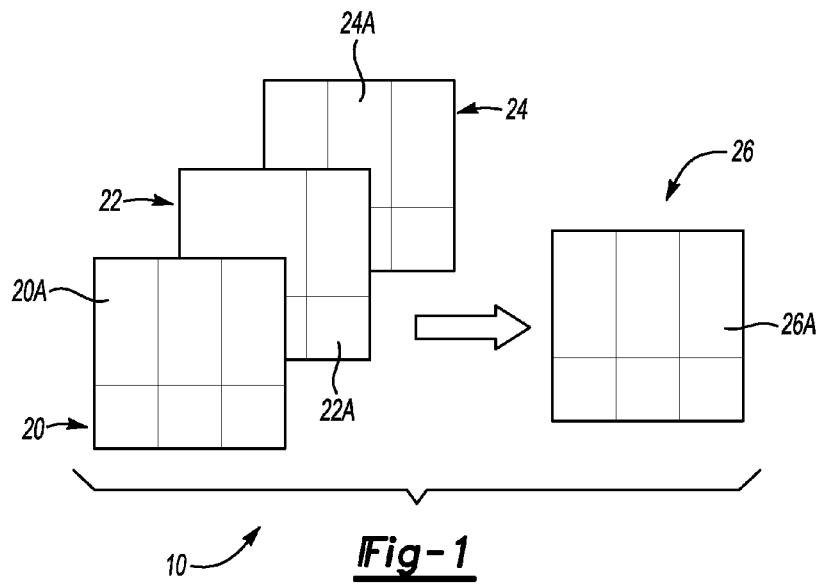
FIG. 1 is a schematic diagram of a system for combining a plurality of images to produce a combined image with a wide dynamic range.
Figure 2:
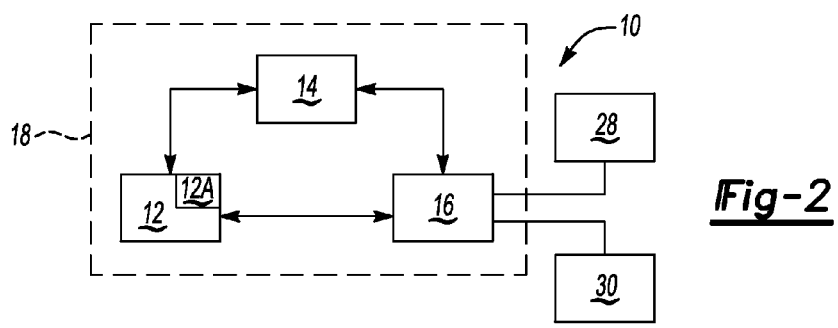
FIG. 2 is a schematic diagram of an imaging unit, a processing unit and a control unit that may be employed in the system of FIG. 1.

Referring to the Figures, wherein like reference numbers refer to the same or similar components throughout the several views, FIGS. 1 and 2 illustrate a system 10 that generates an image with a wide dynamic range using a plurality of still image frames that are captured with differing exposure times. By using multiple images taken with both long and short exposure times, the combined image can have the best features of both: the long exposure time images can resolve details in dark parts of the image, while the short exposure time images allow resolution of bright portions of the image without saturating the image.

Referring to FIG. 2, the system 10 includes an imaging unit 12, a processing unit 14 and a control unit 16 operatively connected to each other. The imaging unit 12 is configured to acquire a plurality of images of the same scene at respective exposure times such that each of the respective exposure times are different from one another. FIG. 1 illustrates three images 20, 22, 24, however, any number of images may be combined. Referring to FIG. 1, the processing unit 14 is configured to combine the plurality of images (such as images 20, 22 and 24) to produce a combined image 26 represented by a set of combined pixels (such as pixel 26A). The imaging unit 12, the control unit 16 and the processing unit 14 may all be part of a single device 18 (FIG. 2). The system 10 may take many different forms and include multiple and/or alternate components and facilities. While an example system 10 is shown in the Figures, the components illustrated in the Figures are not intended to be limiting. Indeed, additional or alternative components and/or implementations may be used.

Referring to FIG. 1, the plurality of images (such as images 20, 22 and 24) are each represented by a set of pixels (such as pixels 20A, 22A, 24A, respectively), each defining a respective pixel intensity. As is known to those skilled in the art, a pixel or picture element is the smallest controllable element of a picture represented on the screen. Any number of pixels may be used. The pixels may be represented in a two-dimensional grid. Each pixel may be identifiable by a two-dimensional coordinate (x,y) corresponding to its physical coordinates. For example, pixel 20A in FIG. 1 may be identified by (1,3) and pixel 22A by (3,1). The images 20, 22 and 24 are taken from the same viewpoint such that they match pixel for pixel.

Referring to FIG. 2, the imaging unit 12 may include one or more lenses and/or filters (not shown) adapted to receive and/or shape light from a scene onto an image sensor 12A. The image sensor 12A may include, for example, one or more charge-coupled devices (CCDs) configured to convert light energy into a digital signal. The charge-coupled device is an analog device that creates small electrical charge in each photo sensor when impacted by light. The charges are converted to voltage one pixel at a time as they are read from the chip and turned into digital data using additional circuitry. The image sensor 12A may include a complementary metal-oxide-semiconductor chip (CMOS), which is an active pixel sensor having circuitry next to each photo sensor converting the light energy to a voltage, which is then converted to digital data using additional circuitry on the chip.

Referring to FIG. 2, the control unit 16 may include an input device 28 and an output device 30 to interact with a user. The input device 28 may include any device that allows the user to provide information or commands to the control unit 16. The input device 28 may include, for example, a computer mouse and/or keyboard. The output device 30 may include any device configured to present information to the user. Thus, the output device 30 may include a display screen or computer monitor, such as a liquid crystal display (LCD) screen.

The control unit 16 and processing unit 14 may be configured to employ any of a number of computer operating systems and generally include computer-executable instructions, where the instructions may be executable by one or more computers. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, the processing unit 14 and control unit 16 may receive instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The control unit 16 and/or processing unit 14 defines a maximum allowed value for each pixel. This may be based on the capacity of the computing devices employed in the control unit 16 and/or processing unit 14. For example, the maximum allowed value for a pixel is 255 for an 8 bit system, and 65535 for a 16 bit system ($2^n-1$, where n is the number of bits). If the imaging unit 12 has a linear light-response characteristic (i.e., how a given pixel maps light intensity to a pixel value), the plot of pixel value versus light intensity is a stair-step function, until the pixel value saturates (i.e. the pixel value reaches the maximum allowed pixel value). The imaging unit 12 may employ devices with either linear or non-linear responses to light.

The control unit 16 of FIG. 2 is adapted to optimize the acquisition of the plurality of images. Control unit 16 does so in part by carrying out process 100 which resides within the control unit 16 or is otherwise readily executable by the control unit 16. Process 100 is described in detail below with reference to FIG. 3.

Figure 3:
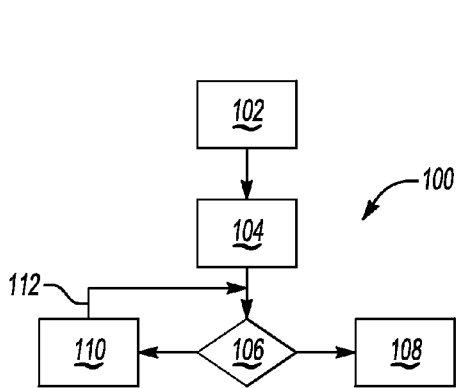
FIG. 3 is a flow chart of a process implemented by the control unit of FIG. 2 for acquiring the plurality of images.

Referring to FIG. 3, in step 102, the control unit 16 sets a first exposure time to a first predetermined value and directs the imaging unit 12 to acquire a first of the plurality of images (such as image 20 of FIG. 1) using the first exposure time. In step 104, the control unit 16 is configured to set a second exposure time to a second predetermined value and direct the imaging unit 12 to acquire a second of the plurality of images (such as image 22 of FIG. 1) at the second exposure time.

In step 106 of FIG. 3, the control unit 16 determines if a sufficient number of images have been obtained based on whether a predefined condition is satisfied. In one example, the predefined condition is satisfied when at least 20% of the respective pixel intensities of the first and second of the plurality of images have reached a saturated value. If the predefined condition is satisfied (step 108), the images (such as 20, 22 in FIG. 1) may be sent to the processing unit 14 for further computation and analysis. Alternatively, the first and second images may be sent to the processing unit 14 as they are being acquired.

If the predefined condition is not satisfied, in step 110 of FIG. 3, the control unit 16 directs the imaging unit 12 to obtain additional images. For example, the control unit 16 sets a third exposure time to a third predetermined value and directs the imaging unit 12 to acquire a third of the plurality of images (such as image 24 of FIG. 1) at the third exposure time if the predefined condition is not satisfied. As shown by line 112 in FIG. 3, the control unit 16 loops back to step 106 to re-determine if a sufficient number of images have been obtained based on whether the predefined condition is satisfied.

Referring now to the selection of exposure times, in one embodiment, the exposure times for the plurality of images are selected to be in fixed ratios to one another. In one example, the exposure times are set to have ratios whose sums add to powers of 2. For example, exposure times proportional to 1, 3, and 12 give divisors of 1, (1+3=4), and (1+3+12=16). This makes the division in substep 210C (of process 200 described below) simple, since the sums of the weighting factors (determined in substep 210C below) will always be powers of 2. In another embodiment, the exposure times may be set dynamically, wherein an image is acquired using a short exposure time, and then subsequent images are acquired with successively longer exposure times until the acquired image has a large number of saturated pixels. Then images can be selected from this set, and combined. In one example, the first exposure time is 2.5 milliseconds; the second exposure time is 10 milliseconds and the third exposure time is 40 milliseconds.

The processing unit 14 of FIG. 2 may be adapted to optimize the combination of the plurality of images. Processing unit 14 does so in part by carrying out process 200 which resides within the processing unit 14 or is otherwise readily executable by the processing unit 14. Process 200 is described in detail below with reference to FIG. 4. As previously noted, the imaging unit 12, control unit 16 and processing unit 14 may be part of a single device 18 (FIG. 2) that carries out both process 100 (FIG. 3) and process 200 (FIG. 4).

Figure 4:
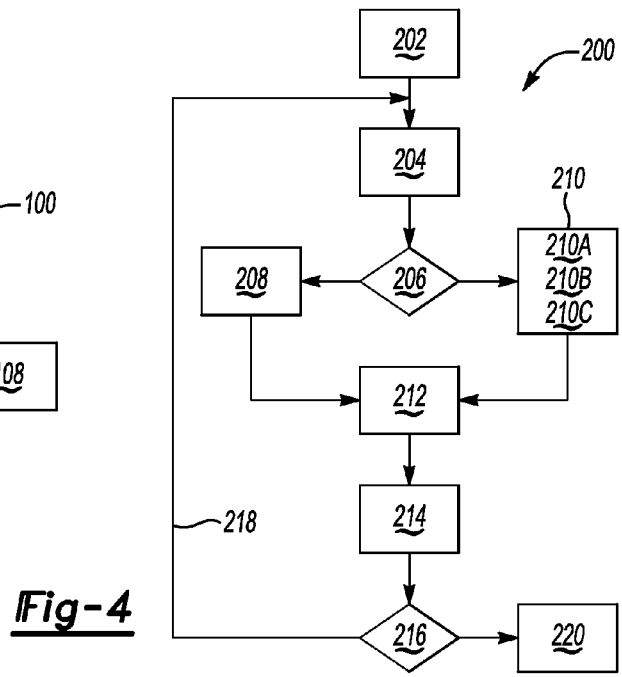
FIG. 4 is a flow chart of a process implemented by the processing unit of FIG. 2 for combining the plurality of images.

Referring to FIG. 4, in step 202, the processing unit 14 receives the respective pixel intensities at a specific coordinate x,y for each of the plurality of images (such as images 20, 22 and 24 in FIG. 1) from the imaging unit 12. The two-dimensional coordinate x,y represents a single pixel in each image. In step 204, the processing unit 14 assigns a respective weighting factor to the pixel at coordinate x,y for each of the plurality of images obtained.

The weighting factor may be set as the exposure time (for that particular image) if the pixel intensity is below the maximum allowed pixel value and zero if the pixel intensity is at the maximum allowed pixel value. Formally, let $P_i$ be the pixel intensity from image i, and let $T_i$ be the exposure time for image i. Thus, the weighting factor $W_i=0$, for coordinate x,y in the image i if the pixel intensity at its maximum allowed value (i.e. pixel intensity is saturated). The weighting factor $W_i$ for coordinate x,y in the image i is set as the exposure time, $W_i=T_i$, if the pixel intensity is below the maximum allowed pixel value (i.e. pixel intensity is not saturated).

In step 206 of FIG. 4, the processing unit 14 determines if the sum of the respective weighting factors is zero ($\Sigma W_i$) for a particular coordinate x,y in each of the plurality of images, in other words, whether every image obtained has a saturated pixel intensity at that coordinate x,y. If this is the case, then the processing unit 14 proceeds to step 208, where the combined intensity value I for coordinate x,y is set to be the maximum allowed pixel value. If the sum of the respective weighting factors is not zero, the processing unit 14 proceeds to step 210.

In step 210 of FIG. 4, the processing unit 14 obtains a combined intensity value ($I_{x,y}$) for each of the combined pixels (such as 26A in FIG. 1) based on the respective weighting factors (obtained in step 202) and the respective pixel intensities (obtained in step 204) for each of the images. In other words, the individual pixel intensities are converted to a combined intensity value using the assigned weighting factors from step 204. This is carried out through substeps 210A, B and C.

First, in substep 210A, for each image obtained, a first value ($A_{x,y}$) is determined for coordinate x,y. The first value for each image is defined as the product of the pixel intensity and the weighting factor at coordinate x,y, divided by the respective exposure time. Assuming there are i total images, $A_{x,y}=W_iP_i/T_i$, where $P_i$ is the pixel intensity at coordinate x,y and $T_i$ is the exposure time for image i.

Next, in substep 210B, a second value ($B_{x,y}$) is determined by summing or adding the first value for each of the plurality of images. Thus $B_{x,y}=\sigma W_i P_i/T_i$.

In substep 210C, the combined intensity value ($I_{x,y}$) at coordinate x,y (is obtained by dividing the second value by a sum of the respective weighting factors ($\Sigma W_i$) for all the images at coordinate x,y. The combined intensity $I_{x,y}$ is determined by equation (1) below (unless the sum of the weighting factors ($\Sigma W_i$) is zero for the plurality of images, in which case it would be processed in step 208).

$$I_{x,y}=\Sigma W_i P_i/T_i/\Sigma W_i \qquad (EQ. 1)$$

Optionally, in step 212 of FIG. 4, the pixel at coordinate x,y may be assigned a color (or hue-saturation-value), as described later. Referring now to step 214 of FIG. 4, the combined intensity values ($I_{x,y}$) of the combined pixels (such as pixel 26A in FIG. 1) are converted into respective mapped values ($M_{x,y}$) using a mapping graph. The processing unit 14 is configured to generate the combined image (such as image 26) based on the respective mapped values ($M_{x,y}$) of the combined pixels.

Figure 5:
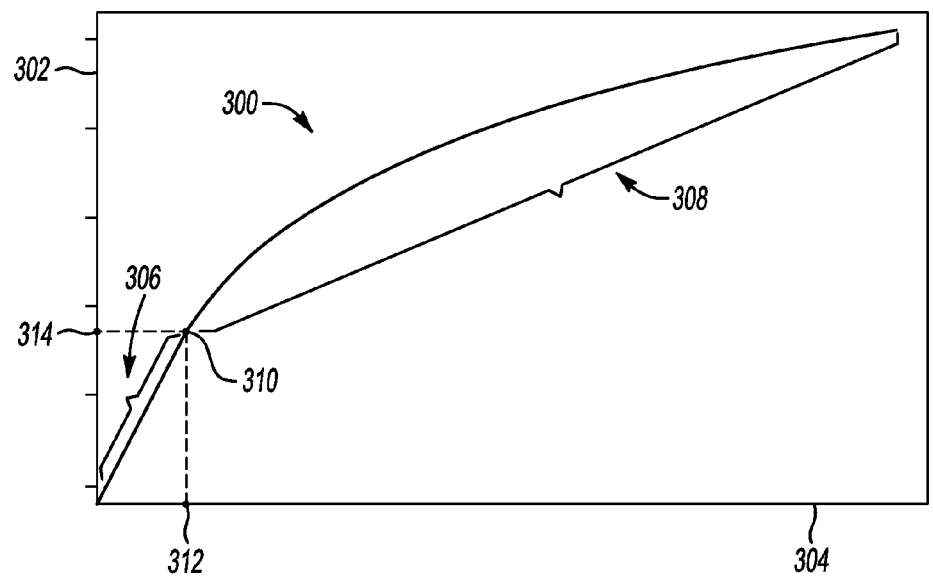
FIG. 5 is an example of a mapping graph that may be employed in the process of FIG. 4.

FIG. 5 shows one example of a mapping graph 300 that may be employed in step 214. The y-axis 302 in FIG. 5 represents mapped values and the x-axis 304 represents combined intensity $I_{x,y}$ (determined in steps 210 and 208 above). Other types of mapping graphs may be employed. In the embodiment shown, a first portion 306 of the mapping graph is a linear scale and a second portion 308 of the mapping graph is a logarithmic scale.

Referring to FIG. 5, the point where the first and second portions 306, 308 meet is referred to herein as the breakpoint k (reference 310). Breakpoint k (reference 310) defines an intensity cut-off point 312. The intensity cut-off point 312 corresponds to a mapped intensity point 314, shown in FIG. 5. Thus, intensities below cut-off point 312 are scaled linearly and intensities above cut-off point 312 are scaled logarithmically. In one example, the intensity cut-off point 312 is set to be 3% of the maximum allowed pixel value. In this example, the first portion 306 of the mapping graph 300 is applied to pixel intensities that are less than or at 3% of the maximum allowed pixel value and the second portion 308 to pixel intensities that are above or at 3% of the maximum allowed pixel value.

Taking M to be the maximum pixel value in the input image and where asterisk represents multiplication, the equations for the linear-logarithmic mapping may be:

$$y=\alpha*x, \text{ if } 0<x<k \text{ (EQ. 2) and } y=\beta+\gamma*\log x \text{ if } k<x<M \qquad (EQ. 2)$$

Taking the logarithm of the combined intensity preserves intensity ratios rather than intensity differences, which retains details in dark parts of the image while not pushing bright parts of the image into saturation. The results are pleasing to the human eye. In one example, a processed image has a maximum pixel value M of 1000. The logarithmic mapping is chosen so that the maximum pixel value maps to the largest allowed output/mapped value. Taking S to be the largest allowed output value (for the mapped intensity values), the mapping graph 300 may be thus be represented by $$\text{LinLog}(x), \text{ such that } \text{LinLog}(M) = \beta + \gamma \log M = S \quad (\text{EQ. 3})$$

At the breakpoint k, the values of the first and second portions 306, 308 (linear and logarithmic parts) of the graph 300 may be matched. Additionally, at the breakpoint k, the slope of the first and second portions 306, 308 may be matched. This gives the conditions $\alpha k = \beta + \gamma \log k$ and $\alpha = \gamma/k$. This enables the determination of constants $\alpha$, $\beta$, and $\gamma$ in terms of k, as shown by equations 4 through 6 below:

$$\alpha = S/k(1 + \log M/k) \quad (\text{EQ. 4})$$

$$\beta = S(1 - \log k)/(1 + \log M/k) \quad (\text{EQ. 5})$$

$$\gamma = S/(1 + \log M/k) \quad (\text{EQ. 6})$$

Referring to FIG. 4, in step 216, the processing unit 14 determines if all the coordinates x,y have been processed. If not, the column or row value is incremented to cover all of the coordinates x,y of the images obtained, and as indicated by line 218, the steps 204 through 214 are repeated for each pixel or coordinate x,y. If all the coordinates x,y have been processed, the combined image is generated (step 220).

Figure 6:
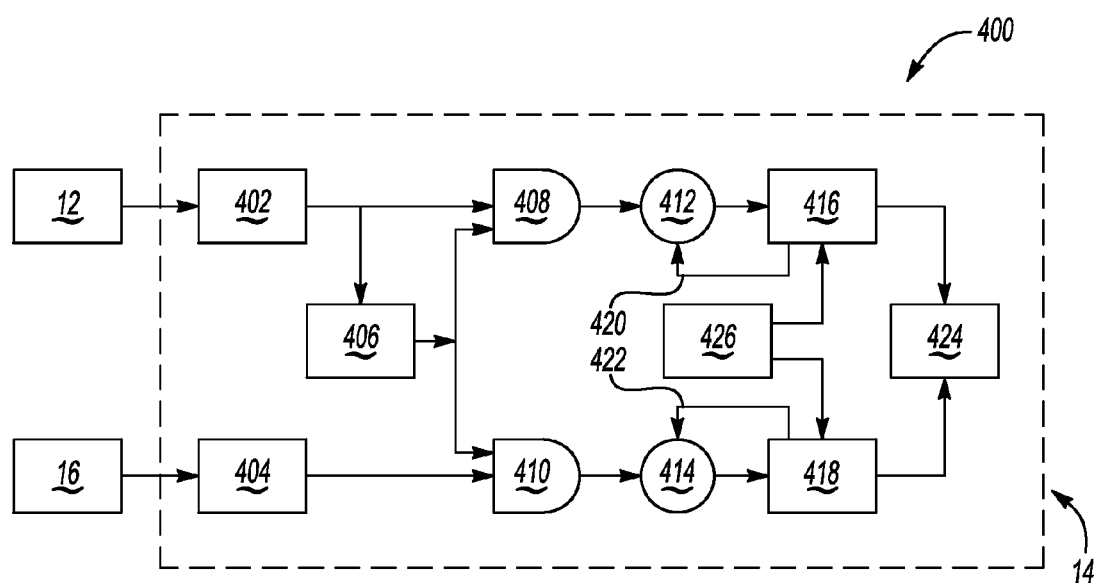
FIG. 6 is an example of a circuit that may be employed in the system of FIG. 1.

Referring now to FIG. 6, a schematic diagram of an example circuit 400 for the processing unit 14 is shown. Circuit 400 enables the processing unit 14 to execute process 200 as the images are being acquired (process 100) in the imaging unit 12. Combining the images as they are being acquired reduces the time between images and therefore, minimizes effects like motion blur. Any suitable type of circuit may be employed.

Referring to FIG. 6, the imaging unit 12 is operatively connected to and sends data from each image acquired to an analog-to-digital converter 402. A pixel clock (not shown) may be employed to divide the incoming signal from the imaging unit 12 into pixels. The control unit 16 enters the exposure time for each image being entered as an input 404. Referring to FIG. 6, the processing unit 14 includes a comparator unit 406 that is configured to determine whether a pixel value is at its maximum allowed value, i.e. whether it is saturated. The processing unit 14 includes "AND" logic gates 408 and 410. As is known, a logic gate is an elementary building block of a digital circuit. Most logic gates have two inputs and one output. At any given moment, every terminal is in one of two binary conditions, represented by different voltage levels. The "AND" logic gates 406 and 408 emits a signal only if both inputs to the gate receive coincident signals. If the comparator unit 406 determines that the pixel value is not saturated, the current pixel value and exposure time (corresponding to the current image) will pass through the "AND" logic gates 408, 410 into respective adder circuits 412, 414 that compute the sum of the pixel intensities ($I_1 + I_2 + \ldots$) and the sum of the weighting factors ($W_1 + W_2 + \ldots$) (as described above in step 210).

As each pixel is processed, a first memory unit 416 stores the sum of the pixel intensities and sends the values of the previous sums through loop 420 (depending on whether this is the first image to be combined or a subsequent image) to the adder circuit 412. A second memory unit 418 stores the sum of the weighting factors and sends the values of the previous sums through loop 422 (depending on whether this is the first image to be combined or a subsequent image) to the adder circuit 414.

Referring to FIG. 6, the processing unit 14 includes a divider unit 424 that is configured to divide the sum of the pixel intensities with the sum of the weighting factors (as described above in step 210) to obtain the combined intensity value I. The first and second memory units 416, 418 may be operatively connected to a memory clearing unit 426 that is configured to clear the memory stored in the first and second memory units 416, 418 prior to receiving the pixel intensities and weighting factors, respectively, from the first image.

The process 200 shown in FIG. 4 may be extended to color images. In one embodiment, the imaging unit 12 may employ a Bayer-pattern imaging chip. As is known, the Bayer-pattern imaging chip places color filters over the pixels of the image sensor, arranged in four-pixel groups; each group will have two green pixels, a red pixel, and a blue pixel. The color for each pixel is generally computed by interpolation. In this embodiment, the processing unit 14 treats the raw images from the imaging unit 12 as gray-scale images and combines them using steps 202, 204, 206 and 212 described above. In step 214 of FIG. 4, the combined image may be converted to a color image (using interpolation or any other process) just prior to the mapping step 216.

In another example, the imaging unit 12 may obtain an RGB (red-blue-green) color image. In step 214 of FIG. 4, the RGB (red-blue-green) color image may be converted to an alternate color space, such as HSV (hue-saturation-value). The HSV (hue-saturation-value) color space converts the three RGB color channels to a hue channel, which carries color information, a saturation channel, which carries information about the color's intensity, and the "value" channel, which is essentially image brightness. The value channels from several images can be combined as previously described above in process 200. The hue and saturation channels may be combined separately. For a given pixel, the image with the maximum saturation value or color intensity may be selected for the saturation channel and the hue value may be taken from that particular image. This allows the generation of a pixel's color by taking it from the image that has the best color information.

In summary, the system 10 allows the capture of digital images that have a wide dynamic range. It captures details in dark parts of the images obtained, while largely eliminating over-exposure and blooming in bright areas. The system 10 is useful in machine vision applications where lighting cannot be controlled, and generates visually-pleasing images for viewing by humans.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A system for creating an image with a wide dynamic range, the system comprising:
   an imaging unit configured to acquire a plurality of images of a scene at respective exposure times such that each of the respective exposure times are different from one another;
   a processing unit and a control unit operatively connected to the imaging unit and to each other;
   wherein the plurality of images are each represented by respective sets of pixels defining respective pixel intensities, each pixel in the respective sets of pixels being identifiable by a two-dimensional coordinate;

wherein the processing unit is configured to combine the plurality of images to produce a combined image represented by a set of combined pixels;

wherein for each of the two-dimensional coordinates the processing unit is configured to:

receive the respective pixel intensities for each of the plurality of images from the imaging unit;

assign a respective weighting factor to the respective sets of pixels in each of the plurality of images;

obtain a respective combined intensity value for the set of combined pixels at each of the two-dimensional coordinates;

convert the respective combined intensity values into respective mapped values using a mapping graph, the respective mapped values being used to generate the combined image; and wherein a first portion of the mapping graph is a linear scale and a second portion of the mapping graph is a logarithmic scale.

2. The system of claim 1, wherein the imaging unit is a digital camera.

3. The system of claim 1, wherein the control unit is configured to:

set a first exposure time to a first predetermined value and direct the imaging unit to acquire a first of the plurality of images using the first exposure time;

set a second exposure time to a second predetermined value and direct the imaging unit to acquire a second of the plurality of images at the second exposure time;

determine if a sufficient number of images have been obtained based on whether a predefined condition is satisfied; and obtain additional images if the predefined condition is not satisfied.

4. The system of claim 3, wherein the predefined condition is satisfied when at least 20% of the respective pixel intensities of the first and second of the plurality of images have reached a saturated value.

5. The system of claim 3, wherein the second exposure time is a constant multiplier of the first exposure time.

6. The system of claim 3, wherein the control unit is further configured to:

set a third exposure time to a third predetermined value and direct the imaging unit to acquire a third of the plurality of images at the third exposure time if the predefined condition is not satisfied.

7. The system of claim 6, wherein the first exposure time is 2.5 milliseconds; the second exposure time is 10 milliseconds and the third exposure time is 40 milliseconds.

8. The system of claim 1, wherein for each of the plurality of images:

the control unit defines a maximum allowed pixel value for each of the respective pixel intensities;

the respective weighting factor is set as the respective exposure time if the respective pixel intensity is below the maximum allowed pixel value; and the respective weighting factor is set as zero if the respective pixel intensity is at the maximum allowed pixel value.

9. The system of claim 1, wherein the obtaining a respective combined intensity value for each of the set of combined pixels includes:

determining a first value for each of the plurality of images as a product of the respective pixel intensities and the respective weighting factors, divided by the respective exposure time;

determining a second value by adding the first value for each of the plurality of images;

obtaining the respective combined intensity value by dividing the second value by a sum of the respective weighting factors for each of the plurality of images.

10. The system of claim 1, wherein the control unit is configured to:

determine if a sum of the respective weighting factors for each of the plurality of images is zero; and set the respective combined intensity value as a maximum allowable pixel value if the sum of the respective weighting factors is zero.

11. The system of claim 1, wherein the first portion of the mapping graph is applied to respective pixel intensities that are less than 3% of a maximum allowed pixel value.

12. The system of claim 1, wherein the imaging unit, the control unit and the processing unit are part of a single device.

13. The system of claim 1, wherein the processing unit includes at least one AND logic gate, at least two memory units, at least one comparator unit and at least one divider unit.

14. A method of creating a wide dynamic range image, the method comprising:

acquiring a plurality of images of a scene at a plurality of respective exposure times, respectively, each of the plurality of respective exposure times being different from one another;

wherein the plurality of images are each represented by respective sets of pixels defining respective pixel intensities, each pixel in the respective sets of pixels being identifiable by a two-dimensional coordinate;

assigning a respective weighting factor to each of the respective pixel intensities in each of the plurality of images;

obtaining a respective combined intensity value at each of the two-dimensional coordinates;

wherein the obtaining of the respective combined intensity values includes:

determining a first value for each of the plurality of images as a product of the respective pixel intensities and the respective weighting factors, divided by the respective exposure time determining a second value by adding the first value for each of the plurality of images; and obtaining the respective combined intensity value by dividing the second value by a sum of the respective weighting factors for each of the plurality of images;

converting the respective combined intensity values into respective mapped values using a mapping graph; and generating a combined image using the respective mapped values.

15. A system for creating an image with a wide dynamic range, the system comprising:

an imaging unit configured to acquire a plurality of images of a scene at respective exposure times such that each of the respective exposure times are different from one another;

a processing unit and a control unit operatively connected to the imaging unit and to each other;

wherein the plurality of images are each represented by respective sets of pixels defining respective pixel intensities, each pixel in the respective sets of pixels being identifiable by a two-dimensional coordinate;

wherein the processing unit is configured to combine the plurality of images to produce a combined image represented by a set of combined pixels;

wherein for each of the two-dimensional coordinates the processing unit is configured to:

receive the respective pixel intensities for each of the plurality of images from the imaging unit;

assign a respective weighting factor to the respective sets of pixels in each of the plurality of images;

obtain a respective combined intensity value for the set of combined pixels at each of the two-dimensional coordinates;

convert the respective combined intensity values into respective mapped values using a mapping graph, the respective mapped values being used to generate the combined image; and determine a sum of the respective weighting factors for each of the plurality of images.

16. The system of claim 15, wherein the control unit is configured to set the respective combined intensity value as a maximum allowable pixel value if the sum of the respective weighting factors is zero.

17. The system of claim 15, wherein the obtaining a respective combined intensity value for each of the set of combined pixels includes:

determining a first value for each of the plurality of images as a product of the respective pixel intensities and the respective weighting factors, divided by the respective exposure time;

determining a second value by adding the first value for each of the plurality of images; and obtaining the respective combined intensity value by dividing the second value by a sum of the respective weighting factors for each of the plurality of images.

18. The system of claim 15, wherein the control unit is configured to:

set a first exposure time to a first predetermined value and direct the imaging unit to acquire a first of the plurality of images using the first exposure time;

set a second exposure time to a second predetermined value and direct the imaging unit to acquire a second of the plurality of images at the second exposure time;

determine if a sufficient number of images have been obtained based on whether a predefined condition is satisfied; and obtain additional images if the predefined condition is not satisfied.

19. The system of claim 18, wherein the second exposure time is a constant multiplier of the first exposure time.

\* \* \* \* \*